(12) United States Patent
Brereton (10) Patent No.: US 9,904,067 B2
(45) Date of Patent: *Feb. 27, 2018

(54) REMOVABLE DIFFRACTION ASSEMBLY FOR ELECTRONIC DEVICE

(71) Applicant: Connor W. Brereton, San Jose, CA (US)

(72) Inventor: Connor W. Brereton, San Jose, CA (US)

(73) Assignee: Connor W. Brereton, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,415

(22) Filed: Feb. 13, 2017

(65) Prior Publication Data

US 2017/0153461 A1    Jun. 1, 2017

Related U.S. Application Data

(62) Division of application No. 14/633,179, filed on Feb. 27, 2015, now Pat. No. 9,569,683.

(Continued)

(51) Int. Cl.
*G06K 9/00* (2006.01)
*G02B 27/42* (2006.01)
(Continued)

(52) U.S. Cl.
CPC .......... *G02B 27/4205* (2013.01); *G03B 11/00* (2013.01); *G03B 17/565* (2013.01);
(Continued)

(58) Field of Classification Search
CPC ........ G06T 5/30; H04N 19/99; H04N 5/2254; H04N 19/96; G06K 9/46; G06K 9/44; G06K 9/36; G03B 17/565; G03B 11/00
(Continued)

(56) References Cited

U.S. PATENT DOCUMENTS 7,358,513 B2   4/2008  Ryzi et al.
7,458,735 B2   12/2008 Souma et al.
(Continued)

OTHER PUBLICATIONS

"U.S. Appl. No. 14/633,179, Non Final Office Action dated May 20, 2016", 11 pgs.
(Continued)

*Primary Examiner* — Kanjibhai Patel
(74) *Attorney, Agent, or Firm* — Schwegman Lundberg & Woessner, P.A.

(57) ABSTRACT

In various embodiments, a system and method for manufacturing and using an optical enhancement assembly in combination with an image-capturing device are presented. In example embodiments, the optical enhancement assembly is affixed over an aperture on the image-capturing device using a securing agent. Light is allowed to travel through the optical enhancement assembly and into the aperture of the image-capturing device such that the light can be recorded as a still image or video. The optical enhancement assembly includes at least a unique fractalized diffraction pattern that impacts light traveling into the aperture and causes a unique diffraction effect on the image or video recorded by the image-capturing device.

10 Claims, 7 Drawing Sheets

Related U.S. Application Data (60) Provisional application No. 61/976,317, filed on Apr. 7, 2014.

(51) Int. Cl.
*G03B 11/00* (2006.01)
*G03B 17/56* (2006.01)
*H04N 5/225* (2006.01)
*G06K 9/44* (2006.01)
*G06K 9/46* (2006.01)

(52) U.S. Cl.
CPC ............. *G06K 9/44* (2013.01); *G06K 9/46* (2013.01); *H04N 5/2254* (2013.01)

(58) Field of Classification Search
USPC ........................................... 382/249
See application file for complete search history.

(56) References Cited

U.S. PATENT DOCUMENTS

| | | | | |
|---|---|---|---|---|
| 8,009,358 | B2* | 8/2011 | Zalevsky | G02B 27/0927 359/618 |
| 8,593,745 | B2* | 11/2013 | O'Neill | G02B 7/14 359/819 |
| 9,036,158 | B2 | 5/2015 | Pesach | |
| 9,569,683 | B2 | 2/2017 | Brereton | |
| 2007/0174467 | A1* | 7/2007 | Ballou, Jr. | H04L 63/0838 709/227 |
| 2013/0088555 | A1* | 4/2013 | Hanina | B41J 3/407 347/107 |
| 2013/0293761 | A1* | 11/2013 | Guenter | H04N 17/002 348/345 |
| 2015/0287175 | A1 | 10/2015 | Brereton | |

OTHER PUBLICATIONS

"U.S. Appl. No. 14/633,179, Notice of Allowance dated Oct. 5, 2016", 7 pgs.

"U.S. Appl. No. 14/633,179, Response filed Apr. 25, 2016 to Restriction Requirement dated Feb. 25, 2016", 7 pgs.

"U.S. Appl. No. 14/633,179, Response filed Sep. 20, 2016 to Non Final Office Action dated May 20, 2016", 8 pgs.

"U.S. Appl. No. 14/633,179, Restriction Requirement dated Feb. 25, 2016", 6 pgs.

"Facebook: Fractal Filters", [Online]. [Archived Apr. 6, 2014]. Retrieved from the Internet: <URL: https://www.facebook.com/fractalfilters>, (Accessed on: Apr. 6, 2014), 2 pgs.

Wong, Nikk, "Fractal Filters: Creative filters to enhance photography!", [Online]. [Archived Apr. 6, 2014]. Retrieved from the Internet: <URL: https://www.kickstarter.com/projects/nikkwong/fractal-filters-creative-filters-to-enhance-your-m>, (Apr. 6, 2014), 14 pgs.

\* cited by examiner

REMOVABLE DIFFRACTION ASSEMBLY FOR ELECTRONIC DEVICE

CLAIM OF PRIORITY

This patent application is a Divisional of U.S. patent application Ser. No. 14/633,179, entitled "REMOVABLE DIFFRACTION ASSEMBLY FOR ELECTRONIC DEVICE," filed Feb. 27, 2015, which application claims the benefit of priority, under 35 U.S.C. Section 119(e), to Connor Brereton U.S. Provisional Patent Application Ser. No. 61/976,317, entitled "DIFFRACTION FILM COMPONENT FOR ELECTRONIC DEVICE," filed on Apr. 7, 2014, which applications are hereby incorporated by reference herein their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, CONNOR BRERETON, All Rights Reserved.

BACKGROUND

In recent years, the field of recreational photography has experienced various advancements, incorporating new software and new photography apparatuses. Some of these software programs and apparatuses are intended to give an image or video a specific effect that would normally be absent. Recently, much of the practice of recreational photography has shifted from photographers using specialized image-capturing devices, such as traditional cameras, to image-capturing devices incorporated in mobile devices. Additionally, some image-capturing devices are intended for a specific setting, such as ones intended to be attached to a helmet when a user is unable to otherwise hold it.

OVERVIEW

An issue encountered with recreational photography is that a user may want to cause a fractalized light pattern on his or her image or video. A fractalized light pattern is typically not possible using a software program or application after the image has already been recorded. The inventive subject matter is a physical optical enhancement assembly that attaches to a camera using various securing agents in order to create a fractalized pattern on light entering the image-capturing device. This document will further explain example structures of the optical enhancement assembly as well as various methods and techniques for manufacture and use of the optical enhancement assembly.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems for constructing an optical enhancement assembly, systems for affixing the assembly with an image-capturing device, as well as methods for using the assembly. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In various example embodiments, systems and methods can be used to create and use an optical enhancement assembly. In one example, the assembly can be created by causing an impression of a diffraction pattern on a transparent or semi-transparent material, such that the material is capable of diffracting light. The assembly can alternatively be created by etching a pattern on the surface of the material such that it forms a diffraction pattern and causes the material to be capable of diffracting light.

The diffraction pattern can be intended to be placed over an aperture of an image-capturing device. An image-capturing device may include any apparatus capable of recording light patterns. Examples of image-capturing devices include but are not limited to still cameras, video cameras, and other devices that include at least one aperture to record light patterns. Further examples also include multipurpose devices that contain cameras or video cameras such as mobile phones, smart phones, laptops, desktops, game consoles, remote devices, and the like.

Once a diffraction pattern is constructed, the assembly can be affixed to at least one type of securing agent. A securing agent can include various types of materials or mechanisms intended to allow a user to affix the optical enhancement assembly to the aperture of an image-capturing device and also allow the user to easily remove the optical enhancement assembly from the image-capturing device.

In a non-limiting example, the securing agent could be a pressure-sensitive adhesive layer and the image-capturing device could be a smartphone. A user could place the optical enhancement assembly over the camera lens (aperture) of the smartphone and apply pressure to engage the securing agent, causing the assembly to adhere to the smartphone. Later, when the user wishes to remove the optical enhancement assembly, the user can disengage the securing agent by peeling the assembly off of the smartphone. In other examples, the securing agent may include a clamping portion or a threading portion to removably affix the optical enhancement assembly with the image-capturing device.

After the optical enhancement assembly is affixed to the image-capturing device, a user can initiate a recording of an image. In an example, a camera shutter for the image-capturing device opens for a user-determined length of time and light is allowed to enter the aperture of the image-capturing device. The image-capturing device can then record the light as a still image or a video. Recording may include saving the image or video to the image-capturing device's memory or uploading the image or video to various services, including but not limited to a cloud-based photo library, a social media network, or a messaging service.

Figure 1:
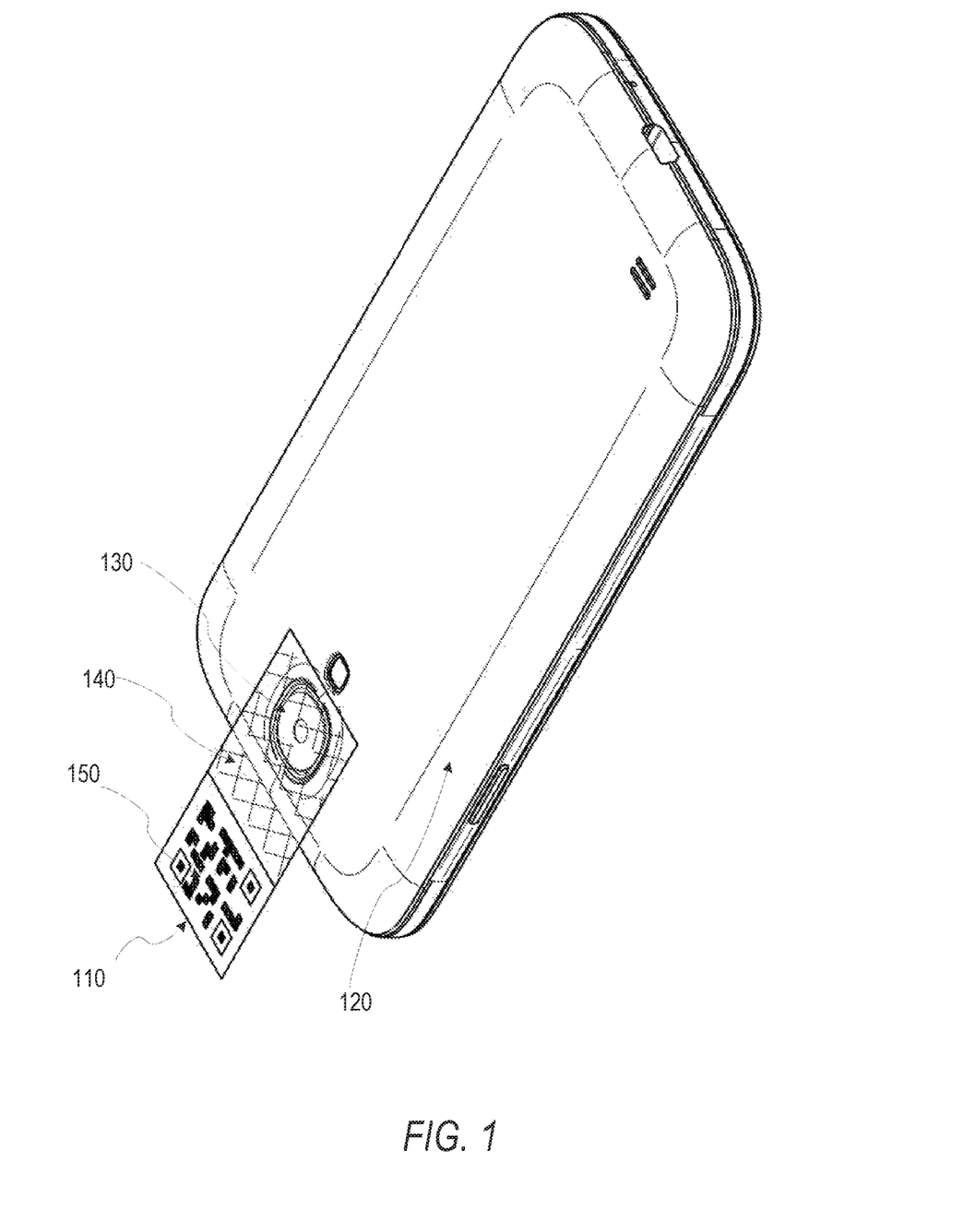
FIG. 1 is an illustration of an example embodiment of the optical enhancement assembly affixed to a mobile device and employing an adhesive securing agent capable of removably affixing the assembly over the aperture of the mobile device.

With reference to FIG. 1, an example embodiment of the optical enhancement assembly in the form of a film optical enhancement assembly 110 removably affixed to an image-capturing device 120 is shown. In this example embodiment, the image-capturing device 120 is a smartphone that includes a camera with an aperture 130. The aperture 130 is typically capable of receiving light and recording still or video representations of the light.

Further in this embodiment, the film optical enhancement assembly 110 comprises a strip of material that is divided into a first and a second section. The first section is an adhesive section 140 that is adhesive on one side and non-adhesive on another side. The adhesive section 140 is removably affixed to the image-capturing device 120 using a substance that can be engaged or disengaged with pressure. The adhesive section 140 in this example also includes a layer of material having a fractalized diffraction pattern capable of altering light entering the aperture 130. The adhesive section 140 can also further include a non-adhesive protective layer on the non-adhesive side that can be compressed by a user to engage the binding substance.

The second section of the optical enhancement assembly 110 is a film gripping section 150 and is non-adhesive on both sides. The film gripping section 150 can include a label to identify the film optical enhancement assembly 110 to inform the user of the type of effect the film optical enhancement assembly 110 will produce on light entering the aperture 130. This label can include words, images, or codes to identify the effect produced by the film optical enhancement assembly 110. Codes can include bar codes or QR codes (as shown) that a user can scan for the purpose of previewing or identifying an effect.

The film gripping section 150 can be further used to disengage the binding substance on the adhesive section 140 using pressure. In an example, the film gripping section 150 can be grasped and pulled outwards from the image-capturing device 120, causing the binding substance on the adhesive section 140 to become disengaged and detaching the entire optical enhancement assembly 110 from the image-capturing device 120.

Figure 2A:
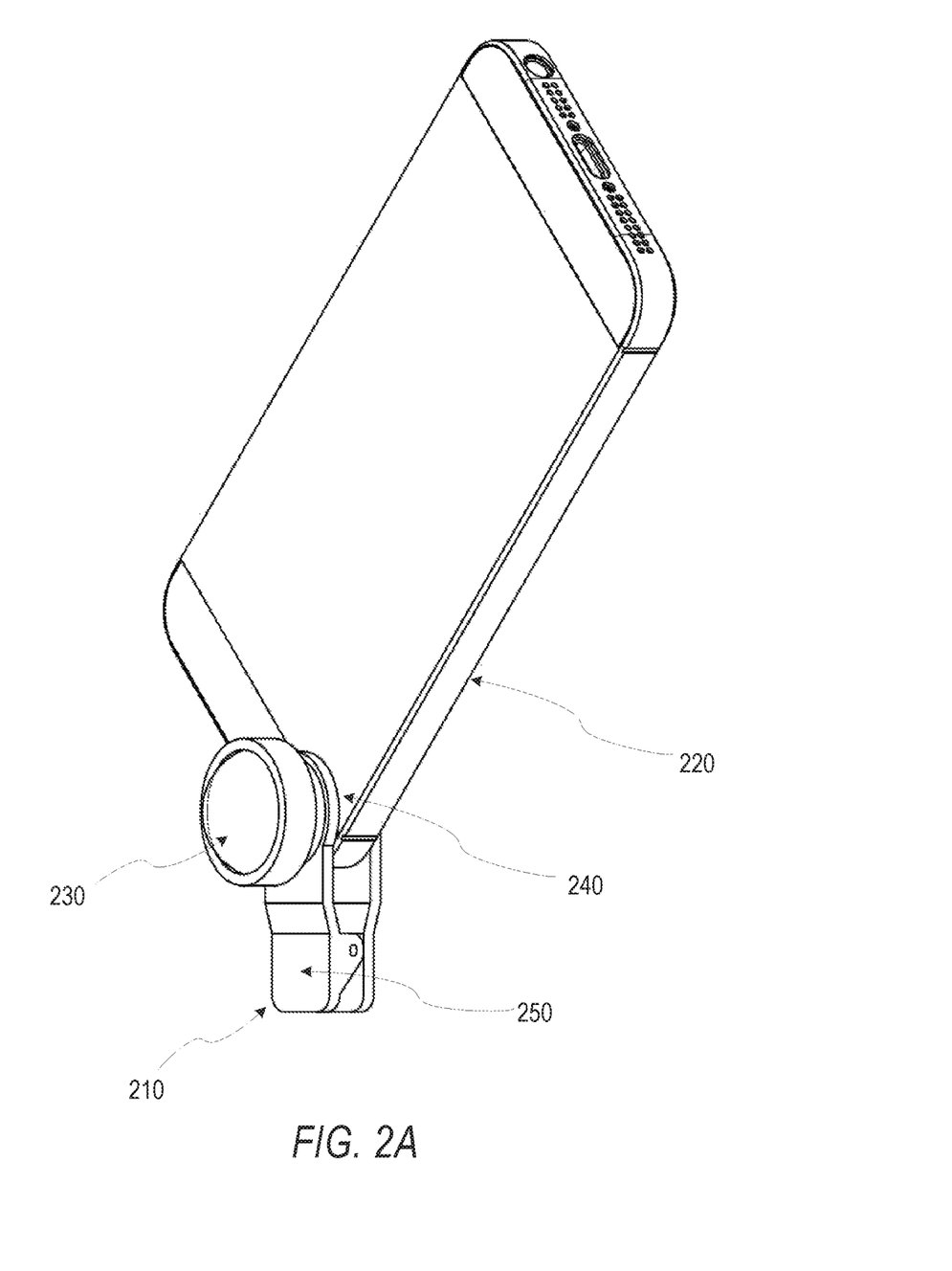
FIG. 2A is an illustration of an example embodiment of the optical enhancement assembly including a fisheye lens affixed to a mobile device and employing a securing agent including a clamping portion to removably affix the assembly over the aperture of the mobile device.

With reference to FIG. 2A, an example embodiment of the optical enhancement assembly in the form of a clamp optical enhancement assembly 210 removably attached to an image-capturing device 220 is shown. In this example embodiment, the image-capturing device 220 is an alternatively designed smartphone incorporating a camera with an aperture 240 (covered by the assembly).

In this example embodiment, the clamp optical enhancement assembly 210 includes a fisheye layer 230 designed to add additional impact to the light entering the image-capturing device 220. The fisheye layer 230 can work in conjunction with the diffraction characteristics of the optical enhancement assembly 210 to create still images and videos with a unique fisheye effect in addition to a diffraction effect.

The clamp optical enhancement assembly 210 additionally includes a clamping portion 250 to act as a securing agent for removably affixing the clamp optical enhancement assembly 210 over the aperture 240 of the image-capturing device 220. The clamping portion 250 can be compressed to allow the clamp optical enhancement assembly 210 to cover the aperture 240 of the image-capturing device 220 and released to affix the clamp optical enhancement assembly 210 to the image-capturing device 220. The clamp optical enhancement assembly 210 can be similarly detached from the image-capturing device 220 by compressing the clamping portion 250 to disengage the clamp optical enhancement assembly 210 with the image-capturing device 220 and then removing the image-capturing device 220.

Figure 2B:
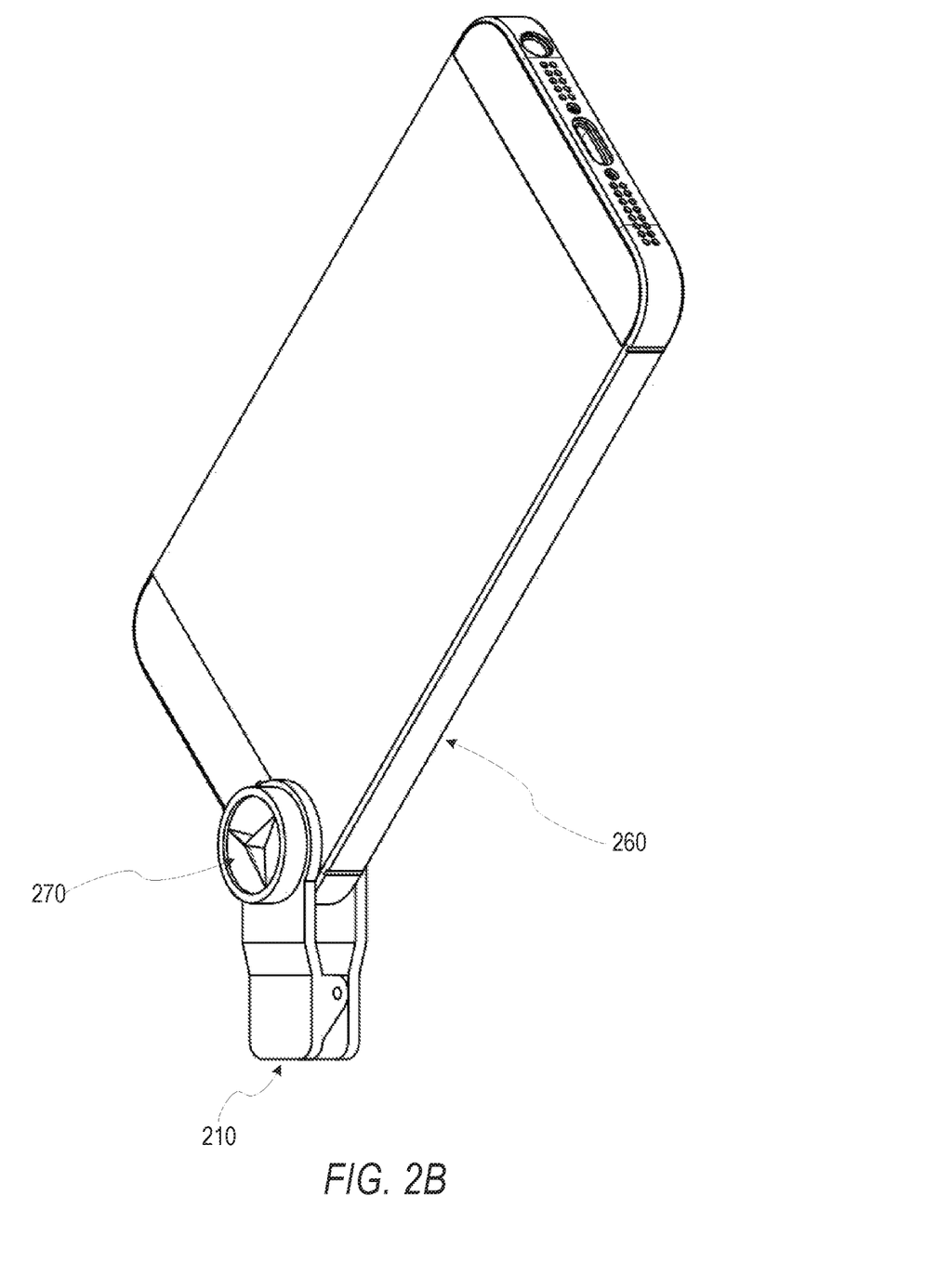
FIG. 2B is an illustration of an example embodiment identical to 4A except that it includes a prism lens instead of a fisheye.

With reference to FIG. 2B, an example embodiment of the optical enhancement assembly in the form of a clamp optical enhancement assembly 210 removably attached to an image-capturing device 260 is shown. All of the characteristics represented in the previous paragraph are identical for securing the clamp optical enhancement assembly 210 to the image-capturing device 260. In this embodiment, however, the clamp optical enhancement assembly 210 includes a prism layer 270 designed to add additional impact to the light entering the image-capturing device 260. The prism layer 270 can work in conjunction with the fractalized diffraction characteristics of the optical enhancement assembly to create still images and videos with a unique prism effect in addition to a diffraction effect.

Figure 3:
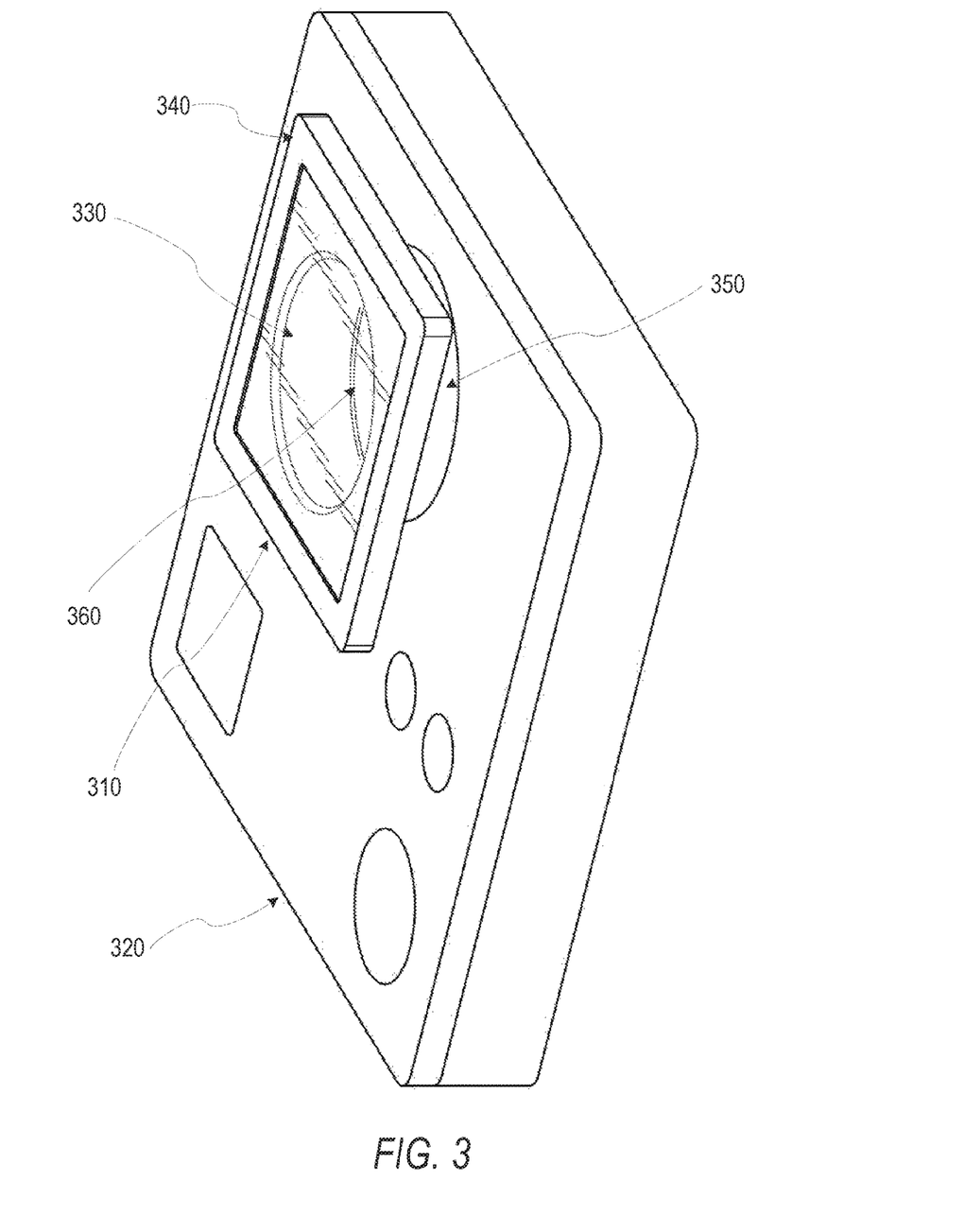
FIG. 3 is an illustration of an example embodiment of the optical enhancement assembly affixed to an image-capturing device and employing a securing agent with a rotatable threaded portion to removably affix the assembly over the aperture of the specialized image-capturing device.

With reference to FIG. 3, an example embodiment of the optical enhancement assembly in the form of a threaded optical enhancement assembly 310 removably attached to an image-capturing device 320 is shown. In this example embodiment, the image-capturing device 320 is an attachable video camera, intended to be attached to a helmet, bicycle, or other instrument such that it can be used hands-free. Similar to the image-capturing devices related in the preceding paragraphs, this image-capturing device 320 includes a camera and aperture 360.

In this example embodiment, the threaded optical enhancement assembly 310 includes an optical enhancement layer 330 that can include fractalized diffraction characteristics as well as well as other optical enhancement features, such as fisheye characteristics or prism characteristics. The optical enhancement layer 330 is intended to impact light entering the image-capturing device 320 in order to create a unique visual effect recorded on the still images and videos captured by the image-capturing device 320.

The threaded optical enhancement assembly 310 further includes a rotating grip 340 and a rotatable threaded portion 350 to act as a securing agent for removably affixing the threaded optical enhancement assembly 310 over the aperture 360 of the image-capturing device 320. In this embodiment, the threaded optical enhancement assembly 310 is secured by grasping the assembly 310 by the rotating grip 340 and covering the aperture 360 of the image-capturing device 320 such that the rotatable threaded portion 350 lines up with a similarly threaded portion of the image-capturing device 320 around the aperture 360. The threaded optical enhancement assembly 310 can be rotated using the rotating grip 340 such that the rotatable threaded portion 350 interlocks with a similarly threaded portion of the image-capturing device 320 to affix the threaded optical enhancement assembly 310 over the aperture 360 of the image-capturing device 320. The threaded optical enhancement assembly 310 can further be disengaged from the image-capturing device 320 by grasping the rotating grip 340 and rotating the rotatable threaded portion 350 the opposite direction until rotatable threaded portion 350 no longer interlocks with the similarly threaded portion of the image-capturing device 320.

This example embodiment can additionally employ a locking feature (not shown) to further secure the threaded optical enhancement assembly 310 to the image-capturing device 320. The locking mechanism can engage when the rotatable threaded portion 350 of the threaded optical enhancement assembly 310 is rotated past a certain position while affixing the assembly to the image-capturing device 320 to prevent the rotatable threaded portion 350 from rotating in reverse. This locking feature can be later manually disengaged in order to detach the threaded optical enhancement assembly 310 from the image-capturing device 320.

Figure 4:
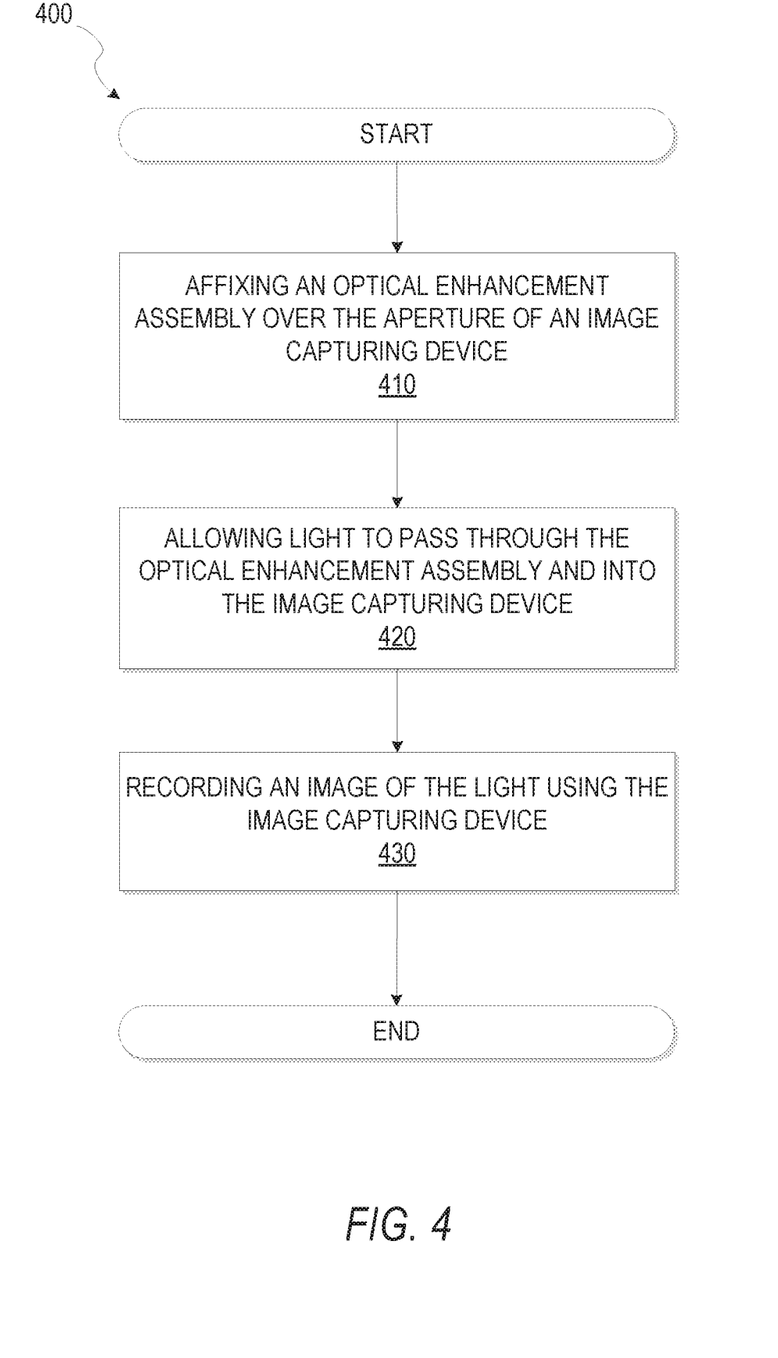
FIG. 4 is a flow diagram illustrating an example method for using the optical enhancement assembly in conjunction with an image-capturing device.

With reference to FIG. 4, a flow diagram illustrating an example method 400 for use of an optical enhancement assembly is shown. This method may be applied to various embodiments of optical enhancement assemblies, including the film optical enhancement assembly 110, the clamp optical enhancement assembly 210, and the threaded optical enhancement assembly 310. Additionally, this method 400 may be applied to various embodiments of image-capturing devices.

It will be appreciated that each of steps 410-430 may be implemented as a single step, combined, or subdivided. Other steps not pertinent to example embodiments may also be included, but are not shown.

As described in the preceding paragraphs, the optical enhancement assembly can function by diffracting or otherwise impacting light entering an aperture, causing a unique visual effect on still images or videos recorded by an image-capturing device. First, a user affixes the optical enhancement assembly over the aperture of an image-capturing device 410. This affixing can be accomplished by way of engaging a securing member portion of the optical enhancement device. The engaging of a securing member, as described in the preceding paragraphs, can include, but is not limited to, applying pressure to an adhesive section 140 of a film optical enhancement assembly 110, compressing and later releasing a clamping portion 250, or rotating a threaded portion 350.

Once the optical enhancement assembly is affixed of the aperture of the image-capturing device, light can be allowed to pass through the optical enhancement assembly and into the image-capturing device 420 through an aperture. Allowing light into the image-capturing device can include causing the image-capturing device to open and close a mechanical camera shutter inside the aperture to allow light into the device.

After light enters the image-capturing device, an image of the light can be recorded by the image-capturing device 430. The recording can be stored in a memory section or vessel coupled with the image-capturing device. The image recorded can include a still image where light enters the device and is recorded for a predetermined amount of time or a series of images in the form of a video where light enters the device and is recorded until the device is caused to stop recording.

The image or video can further be recorded on a network via an automatic or user-initiated upload. The network may include, but is not limited to, a cloud-based photo library, a social media network, or a messaging service.

Figure 5:
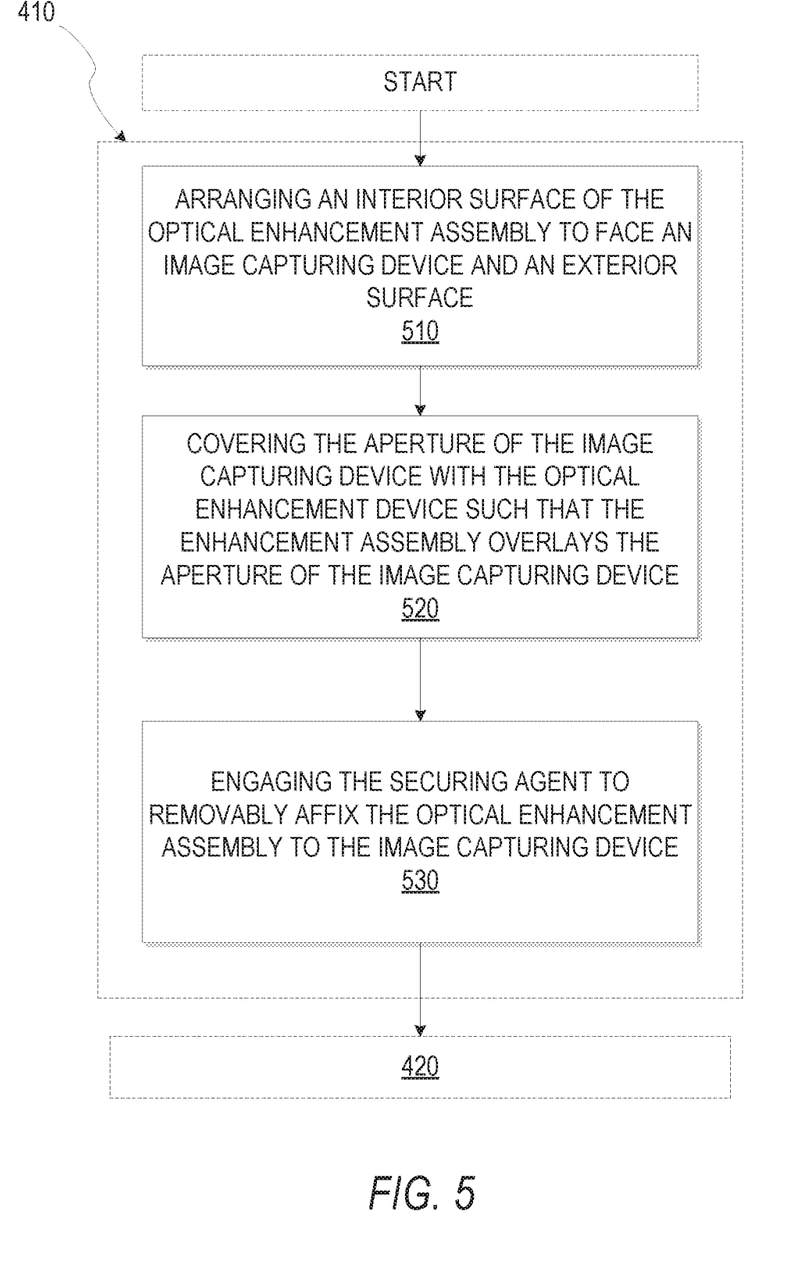
FIG. 5 is a flow diagram illustrating the method of affixing the optical enhancement assembly with the image-capturing device using a securing agent in greater detail.

With reference to FIG. 5, an example detail flow diagram of step 410 in FIG. 4 is shown. As described in the preceding paragraphs, the optical enhancement assembly can be affixed over the aperture of an image-capturing device. For the affixing to occur, an interior surface of the optical enhancement assembly that is intended to face the aperture of the image-capturing device can be arranged to face the image-capturing device and an exterior surface of the optical enhancement assembly can be arranged to face outwards 510.

In a previous example embodiment using a film optical enhancement assembly 110, a binding substance intended to adhere the assembly to the image-capturing device can be arranged to face the image-capturing device to be effective. Similarly, the exterior side of the assembly without the binding substance can face outwards, such that a user can apply pressure to this side and cause the binding substance to adhere the assembly to the image-capturing device.

After the interior and exterior surfaces of the assembly are appropriately arranged, the aperture of the image-capturing device can be covered with the optical enhancement assembly such that the assembly overlays the aperture of the device 520. Continuing the example embodiment with the film optical enhancement assembly 110, this would include placing the appropriately arranged assembly on the aperture of the image-capturing device.

Once the optical enhancement assembly overlays the aperture of the image-capturing device, a securing agent can be engaged to removably affix the assembly to the device 530. Further continuing the example embodiment with the film optical enhancement assembly 110, this would include applying pressure to the exterior side of the adhesive section 140 to adhere the assembly to the image-capturing device.

Figure 6:
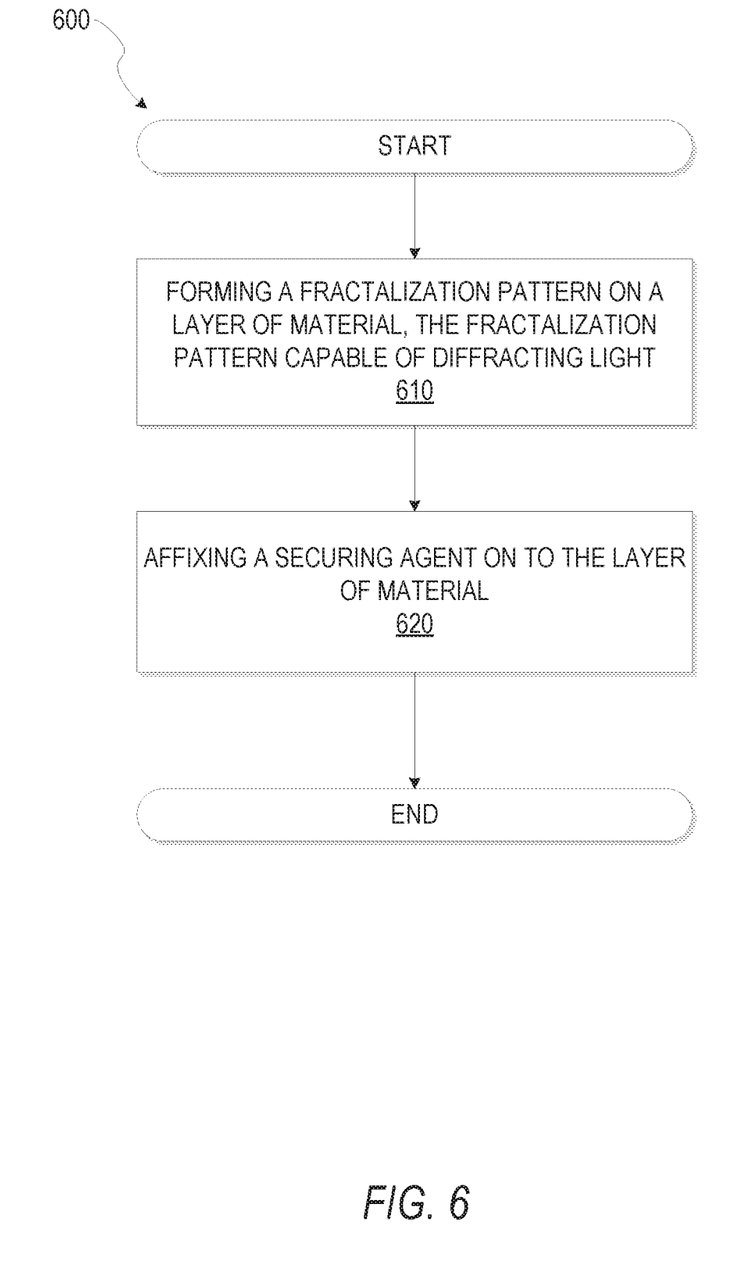
FIG. 6 is a flow diagram illustrating an example method for manufacture of the optical enhancement device.

With reference to FIG. 6, a flow diagram illustrating an example method of manufacturing an optical enhancement assembly is shown. In a first step, a fractalization pattern capable of diffracting light is formed onto a layer of material 610. Various methods can be used to create the fractalization pattern, including causing an impression of the pattern using a die or other impression template, as well as mechanically or manually etching the pattern.

After forming the fractalization pattern, a securing agent can be affixed to the optical enhancement assembly 620. As shown in the preceding paragraphs, a securing agent can include a binding substance to removably affix a film optical enhancement assembly 110 to an image-capturing device. A securing agent can also include a clamping portion 250 to removably affix a clamp optical enhancement assembly 210 to an image-capturing device or a threaded portion to removably affix a threaded optical enhancement assembly 310 to an image-capturing device. These securing agents and other embodiments of securing agents can be removably or irremovably affixed to the optical enhancement assembly.

The invention claimed is:

1. A removably attachable optical enhancement assembly for use with an image-capturing device for altering light signals entering an apparatus of the device, the optical enhancement assembly comprising:

a fractalizing layer including a fractalized diffraction pattern to operatively diffract light entering an aperture of the image-capturing device; and a securing agent to removably secure the assembly to the image-capturing device such that the assembly abuts against the image-capturing device over the aperture of the image-capturing device.

2. The removably attachable optical enhancement assembly of claim 1, wherein the fractalization layer is semi-translucent.

3. The removably attachable optical enhancement assembly of claim 1, wherein the assembly includes a protective layer having a surface overlaying the fractalizing layer.

4. The removably attachable optical enhancement assembly of claim 1, wherein the securing agent includes a pressure-sensitive adhesive layer capable of affixing the fractalizing layer over the aperture of the image-capturing device.

5. The removably attachable optical enhancement assembly of claim 1, wherein the securing agent includes a clamping portion to secure the assembly over the aperture of the image-capturing device.

6. The removably attachable optical enhancement assembly of claim 1, wherein the assembly includes an additional prism layer to operatively create an effect of a plurality of subjects from a single focus point of light entering the image-capturing device.

7. The removably attachable optical enhancement assembly of claim 1, wherein the assembly includes an additional fisheye layer to operatively create a fisheye effect on light entering the lens.

8. A method for manufacturing a removably attachable optical lens assembly comprising:
    forming a fractalization pattern on a layer of material, the fractalization pattern capable of diffracting light, wherein forming a fractalization pattern on the layer of material includes one or more of:
    impressing an imprint of the fractalization pattern on the layer of material, and
    etching the fractalization pattern on the layer of material; and
    affixing a securing agent on to the layer of material, wherein affixing the security agent on to the layer of material includes one or more of:
    affixing a pressure-sensitive adhesive layer on the layer of material,
    affixing the securing agent on to the layer of material using a clamping element, and
    affixing the securing agent using a rotatable threaded element.

9. The method of claim 8, wherein the first layer of material is a layer of semi-translucent polymer.

10. The method of claim 8, where the rotatable threaded element includes a locking mechanism to prevent reverse rotation.

* * * * *